Feb. 26, 1957　　D. A. DOTSON　　2,782,994
ELECTRONIC TEMPERATURE REGULATOR WITH ANTICIPATOR
Filed Sept. 24, 1953
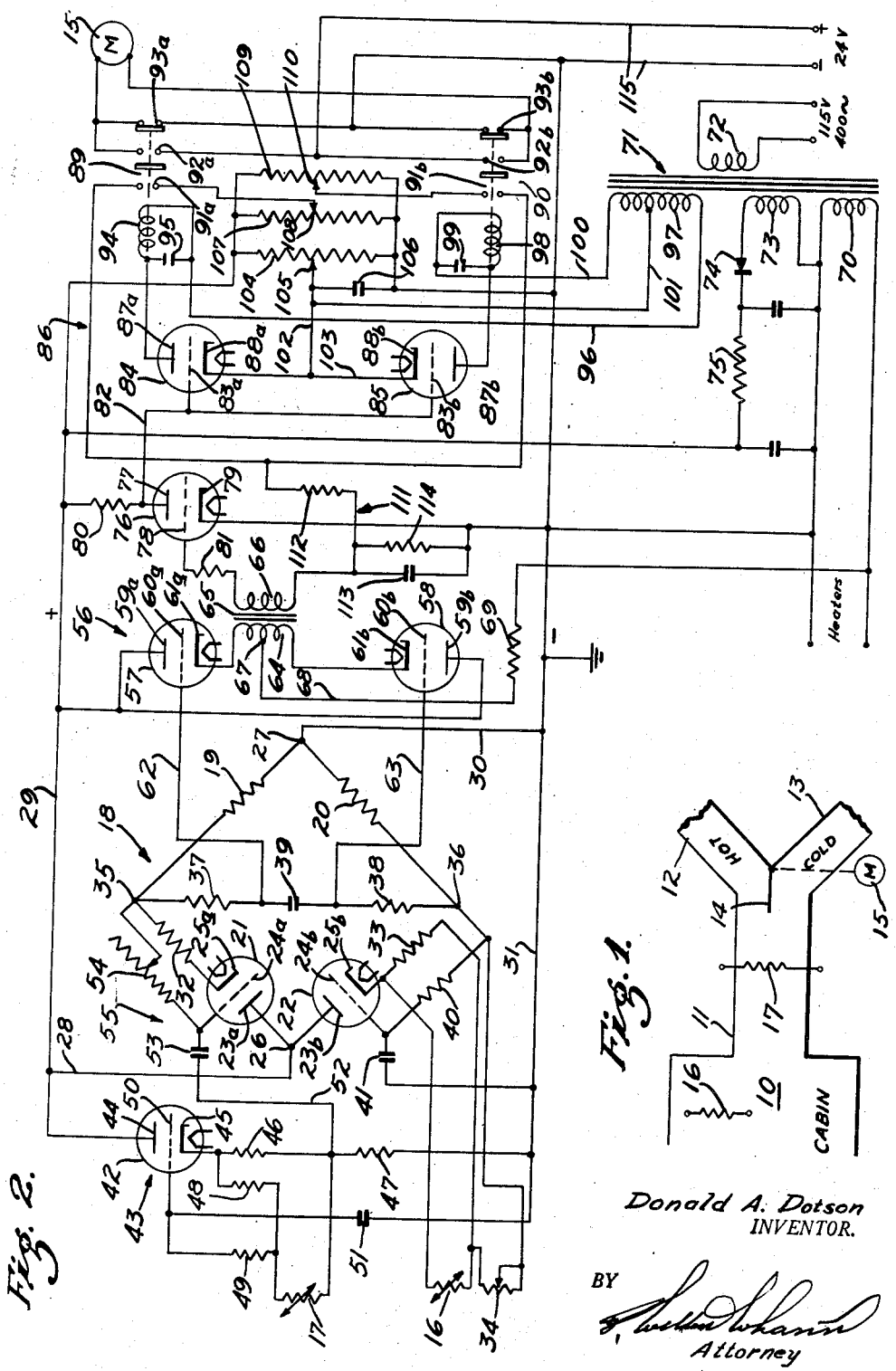
Donald A. Dotson
INVENTOR.
BY
Attorney

United States Patent Office 2,782,994
Patented Feb. 26, 1957

2,782,994

ELECTRONIC TEMPERATURE REGULATOR WITH ANTICIPATOR

Donald A. Dotson, Los Angeles, Calif., assignor to The Garrett Corporation, Los Angeles, Calif., a corporation of California Application September 24, 1953, Serial No. 382,150

17 Claims. (Cl. 236—78)

The present invention relates generally to regulating means, and is concerned more particularly with a floating type electronic temperature regulator for a compartment, chamber, duct or other area arranged to be temperature conditioned by a fluid or mixture of fluids.

The present invention is susceptible of general application for the regulation of characteristics of fluids, and it is not intended that it shall be limited to the control of temperature only of fluid. However, for illustrative purposes, the invention will be described herein as being utilized for the regulation of the temperature of an aircraft compartment to which a temperature controlling medium such as air is furnished through a supply duct connected with controlled hot and cold sources, or provided with suitable heating and cooling means by which the temperature of air flowing to the duct may be varied.

Briefly, the invention comprises electronic control means for regulating the supply of temperature controlling medium from the hot and cold sources, and for such purpose utilizes a direct current bridge network which embodies a sensing device for the main compartment, and an anticipator sensing device which is positioned in the main duct and is adjustable to regulate the rate of temperature correction in accordance with the time constant of the compartment.

The output or unbalance signal of the bridge network is utilized to control a pulsating direct current in a chopper vacuum tube circuit in which the pulses are impressed on a tapped primary winding of a transformer in such a manner as to produce in the secondary of the transformer an alternating current which is varied with respect to its phase sense in accordance with the direction of unbalance of the bridge network.

The transformer secondary is connected in a grid limiting circuit of a vacuum tube which is arranged to form with the transformer a discriminator in which the output of the vacuum tube comprises positive pulses which are correspondingly varied as to their phase sense depending upon the direction of unbalance of the bridge network.

The pulses are utilized to actuate a triggering circuit for control of temperature corrective means arranged to apply a feedback to the grid limiting circuit of the discriminator, this feedback being of such character as to cause pulsing operation of the temperature corrective means in such manner that the output of power pulses vary in pulse length or duration and frequency or pulse repetition rate directly with the magnitude of bridge unbalance output.

It is one object of the herein described invention to provide a temperature regulator in which the sensing or pick-up devices operate on direct current rather than alternating current, thus avoiding errors and abnormal operation which might result from inductive effects.

A further object is to provide a temperature regulator embodying a balanced electronic control network which incorporates a long time constant that may be readily adjustable to conform with the time constant of the space which is conditioned.

Another object is to provide in temperature regulating apparatus, novel means for modulating the temperature corrective mechanism according to a received error signal, wherein the corrective mechanism is pulsed in such a manner as to deliver a percentage of available energy, which may be either proportional or of a predetermined ratio to the original error signal.

Another object is to provide a temperature regulator of the electronic type capable of handling extremely large input signals, and in which provision is made for automatically compensating for line voltage changes, the system being virtually insensitive to very wide line voltage changes.

Further objects of the invention will be brought out in the following part of the specification, wherein detailed description is for the purpose of fully disclosing the invention without placing limitations thereon.

Referring to the accompanying drawing, which is for illustrative purposes only:

Fig. 1 is a view diagramatically illustrating an adaptation of the invention for regulating the air temperature of an aircraft compartment, such as a cabin; and Fig. 2 is a schematic view showing a control system embodying the invention.

Referring generally to the drawings, a typical arrangement is shown for controlling the temperature of an airplane cabin 10 to which temperature controlling air is supplied through an inlet duct 11 connected to receive hot air from a duct 12 and cold air from a duct 13. The ducts 12 and 13 are connected with suitable hot air and cold air sources, respectively (not shown).

The temperature in the duct 11 is varied by proportioning the air flow from ducts 12 and 13, which may be accomplished by means of a proportioning or control valve 14 arranged to be actuated by suitable power means, shown in the present instance as being a reversible electric motor 15.

The cabin temperature is sensed by a suitable element or device, shown as comprising in this instance a thermistor 16, but which in practice may comprise one or more electrically interconnected elements. In the present instance, it will be regarded as a single element for clarity. Another thermistor 17 is shown as being positioned in the duct 11. This thermistor or other suitable device constitutes an anticipator sensing device which is adjustable and associated with an adjustable time constant network which may be set to correspond with the time constant of the cabin or space which is being temperature conditioned.

The regulating apparatus of the present invention is arranged to be basically responsive to an error signal originating in a bridge network 18. Two arms of the bridge network are formed by resistors 19 and 20, respectively, which are so connected as to form loading resistors in the respective plate circuits of triodes 21 and 22 that are operatively connected to form the other two arms of the bridge network. Although the triodes 21 and 22 are disclosed as comprising separate vacuum tubes, it will be appreciated that these two tubes may be incorporated in a single envelope so as to form a double triode, if desired. The triode 21 is shown as having a plate or anode 23a, a control grid 24a and a cathode 25a, while the triode 22 has a plate or anode 23b, a control grid 24b, and a cathode 25b.

The bridge input connection is made at points 26 and 27, the point 26 being connected with the anodes 23a and 23b respectively, and through a conductor 28 to a conductor 29 which forms the positive side of a plate voltage supply circuit. The point 27 is at the juncture of resistors 19 and 20, and is connected through a conductor 30 to a conductor 31 which is shown as comprising the negative grounded side of the supply circuit.

The cathode 25a is connected through a cathode resistor 32 to resistor 19, while the cathode 25b is connected through a cathode resistor 33 and a variable selector resistor 34 to the resistor 20. The bridge output is between point 35 at the juncture of resistors 32 and 19, and point 36 at the juncture of resistor 34 and resistor 20. The points 35 and 36 are respectively connected through isolating resistors 37 and 38 to the opposite sides of a capacitor 39 which is adapted to be charged to a direct current potential of a magnitude and polarity depending upon the extent and direction of bridge unbalance.

It will be observed that the thermistor 16 is connected in shunt relation with resistor 33, these two resistors in turn being in series with the resistor 34. As thus arranged, the resistor 34 may be varied to select the normal temperature with respect to the cabin, which it is desired to maintain therein. The thermistor 16 therefore acts in response to temperature changes to shift the potential at point 36 with respect to ground and a normal reference voltage as established at point 35 by the triode 21. The grid 24b is connected through a resistor 40 to point 36, and through a capacitor 41 to conductor 31, this resistor and capacitor acting as a filter circuit.

In the illustrated embodiment, it will be noted that the variations of the anticipator thermistor 17 is utilized to control a triode 42 of an anticipator amplifier pick-up and inverter as generally indicated at 43. The triode has a plate or anode 44 which is connected to the conductor 29, and a cathode 45 which is connected through a cathode bias resistor 46 and load resistor 47 to the negative conductor 31. There is shunted around the resistor 46, a resistor 48 which is in series with the thermistor 17 and cooperates therewith to form a voltage divider, a decoupling resistor 49 being connected between the juncture of the resistor 48 and thermistor 17, and a grid 50 of the triode, the grid being connected through a capacitor 51 to the negative conductor 31. The resistor 49 and capacitor 51 coact to form a filter circuit to ground.

The triode 21 is coupled with the output of triode 42 by means of a cathode follower connection 52 which contains a capacitor 53, one side of this capacitor being connected through the connection 52 with the juncture between resistors 46 and 47, while the other side of the capacitor is connected with the grid 24a, and through an adjustable high impedance element 54 with point 35 of the bridge. The impedance element 54 and capacitor 53 cooperate to provide an R-C network as generally indicated by the numeral 55 which in association with the cathode follower action of triode 21 introduces a long time constant for the action of the anticipator, which can be adjusted for different cabin time constants.

With the foregoing arrangement, it will be apparent that the triode 21 establishes the normal reference voltage level of the bridge network, against which the variable voltage of triode 22, as controlled by thermistor 16, operates to determine the direction and amount of bridge unbalance. Moreover that, when similar temperature changes are sensed by the thermistors 16 and 17, their effect with respect to bridge unbalance is cumulative, while under conditions where a demand is made upon thermistor 16, the change occasioned by this demand, when sensed by the thermistor 17, will be such as to tend to restore the bridge to balanced condition depending upon the time constant adjustment of the R-C circuit 55 and the extent of unbalance. The utilization of direct current for the bridge network, and the sensing thermistors, is advantageous in that errors due to inductive effects are eliminated.

A chopper network, as generally indicated at 56, is provided and by means of which the direct current bridge unbalance voltage is changed into a proportional A. C. voltage or a voltage having a predetermined ratio with respect to the original error signal. For such purpose, triodes 57 and 58 are utilized. The triode 57 has a plate or anode 59a, a control grid 60a and a cathode 61a, while the triode 58 has a plate or anode 59b, a control grid 60b and a cathode 61b. These tubes have their anodes connected directly to the positive potential conductor 29, while their control grids are connected respectively by conductors 62 and 63 to the opposite sides of capacitor 39 so that the potential applied to the grids will depend upon the direction of unbalance of the bridge network. The cathodes 61a and 61b are connected respectively to the ends of a primary winding 64 of a transformer 65 in which the primary winding is inductively coupled with a secondary winding 66. The primary winding of the transformer is provided with a midtap 67 which is connected by a conductor 68 through a resistor 69 with one terminal of a secondary winding 70 of a power transformer 71 having a primary winding 72 adapted to be energized from a suitable power source, shown in the present instance as being 115 volts, 400 cycles. The secondary winding 70 is arranged to supply current to the filament heaters of the tubes, and is shown as being connected in series with a secondary winding 73 having its output connected through a suitable rectifier 74 and filter circuit 75 to positive conductor 29 and negative conductor 31.

Pulsating direct currents are thus applied to the sections of the primary winding 64, which normally flow towards the midtap 67 and are in opposition. Thus, under balanced bridge conditions these pulsations will cancel out. However, depending upon the direction of unbalance of the bridge, the grids 60a and 60b will be selectively controlled so that the pulsating plate current will flow in one direction or the other in the primary winding 64, and thus induce an alternating current in the secondary winding 66 which will have one phase for bridge unbalance in one direction, and a reversed phase relation for bridge unbalance in an opposite direction.

The transformer 65 couples the chopper network with a discriminator network containing a triode 76 having an anode or plate 77, a control grid 78 and cathode 79. The anode 77 is connected through a load resistor 80 to the positive conductor 29, while the cathode is connected to the negative conductor 31. The control grid 78 is connected in circuit with the secondary winding 66 of the transformer 65, a high impedance element 81 being inserted in this circuit so as to form a conventional grid limiter which acts to attenuate the positive half-cycles of the A. C. current flowing in the secondary of the transformer 65 to substantially zero at the grid 78, but accepts the negative half-cycles of the voltage which will, of course, be shifted as to its phase sense depending upon the unbalance of the bridge. The negative half-cycles acting on the grid 78 will control current flow in the plate circuit of triode 76, and as a result will establish a plate voltage which varies in positive half-cycles, and which have a phase sense depending upon the direction of bridge unbalance.

The amplifying triode 76 is arranged to operate at essentially zero bias, and has its plate potential, by virtue of conductor 82, impressed directly upon control grids 83a and 83b of triodes 84 and 85 of a triggering circuit generally indicated by numeral 86. The triode 84 has an anode or plate 87a and cathode 88a, while the triode 85 has an anode or plate 87b and cathode 88b.

The triodes 84 and 85 selectively control the operation of modulating relays 89 and 90. The relay 89 has normally open contacts 91a, normally open contacts 92a and normally closed contacts 93a, which are operable in response to energization and deenergization of an operating coil 94 that is shunted by a capacitor 95 and connected in the plate circuit of triode 84 by a conductor 96 which connects the plate 87a through the coil 94 with one terminal of a secondary winding 97 of the multi-secondary transformer 71.

The relay 90 has normally open contacts 91b, normally open contacts 92b and normally closed contacts 93b which are arranged to be similarly actuated by an operating coil 98 that is shunted by a capacitor 99 and connected in the plate circuit of triode 85 by a conductor 100 which connects the plate 87b through operating coil 98 with the opposite end of the secondary winding 97. The winding 97 has a middle tap which is connected by conductors 101, 102 and 103 to the cathodes 88a and 88b.

With the arrangement thus far described, the triodes 84 and 85 will be selectively operable in accordance with the phase of the output pulse from triode 76. When the amplitude of this pulse is such as to cause plate current sufficient to pull in the relay in its plate circuit, this relay will operate, and through contacts 92a and 93a, or contacts 92b and 93b, depending upon the relay operated, will connect the motor 15 for operation in one direction or a reverse direction, as will be more fully described subsequently, so as to correctively move the valve 14 in the required direction for causing the proper temperature change as required by bridge unbalance.

The dead band control, or the amount of unbalance which will be required before the triggering circuit starts to function, is determined by adjusting the potential of the cathodes of triodes 84 and 85. For such purpose, a resistor 104 is connected between conductors 29 and 31, this resistor forming a voltage divider having an adjustable contact 105 connected with conductor 102 which permits variation of the cathode potential and thus regulates the threshold which must be overcome by the action of the control grid before the triggering circuit will operate. The contact 105 is connected to conductor 31 through a filter capacitor 106.

Two additional voltage dividers are provided. One is formed by a resistor 107 which is connected between the conductors 29 and 31 and has a movable contact 108. The other voltage divider is formed by a resistor 109 having a movable contact 110. These voltage dividers are independently adjustable and provide a source of positive potential which may be selectively applied through the closure of switch contacts 91a, or closure of contacts 91b, as the case may be, to an R-C network 111 which includes in addition to the resistor 107 or 109, a charging resistor 112, a capacitor 113, and a discharge resistor 114 which is in shunt relation to the capacitor and is connected at one end to the juncture between resistor 112 and one end of the transformer secondary winding 66, and its other end to negative conductor 31.

The closure of contacts 91a or 91b therefore instigates a modulation cycle wherein a rising positive voltage, as controlled by the charging time of R-C network 111, is combined with the unbalance or error signal appearing on the secondary of transformer 65 and continues to rise until the D. C. component from the R-C network is equal to the peak signal voltage. The resultant combination now appears as a signal varying from zero to two times the peak signal, and which is of positive polarity. With this wholly positive signal appearing at the input of triode 76, the triode 76 conducts; and the signal obtained from its plate is attenuated essentially to zero. The plate current of the tube 84 or 85 flowing through the relay, which is energized, is thus reduced to a drop out value, and the relay will thereupon open to disconnect the R-C network from its voltage source 107 or 109, and at the same time stop the operation of the motor 15.

Upon opening of the relay contacts, the D. C. component at the input of triode 76 is permitted to discharge to ground through the discharge resistor 114 until the negative peaks of the error signal are again of sufficient amplitude to cause closure of the proper relay to repeat the operating or pulsing cycle of the motor 15.

With the feedback arrangement for energizing and de-energizing the R-C network in response to the operation of relays 89 and 90, the motor 15 will be actuated in pulses which vary as to pulse length and frequency directly with the magnitude of the error or unbalance bridge signal. As shown, the motor in the present instance is arranged to be energized from a 24 volt D. C. source through a supply circuit 115. In this case the relay contacts merely reverse the direction of supply to the motor 15. If desired, however, the contacts may be utilized to control a motor which is arranged to operate on alternating current instead of direct current. It will further be apparent that, since the resistors 107 and 109 are independently adjustable, the R-C timing interval may be made one value for one direction of bridge unbalance and a different value for the opposite direction of unbalance, if desired.

The modulating control as described above has the added advantage in that by supplying a lag in the feed back signal, due to charging time of the R-C network 111, the resultant output appears as a lead of the error signal and as such helps to stabilize the complete system.

Modulation of the power supplied to the motor 15 or other actuator which may be utilized is achieved in the discriminator network by a form of signal attenuation, without shifting the operating point of triode 76. Due to this method of operation, it is possible to handle extremely large input signals.

The system of the present invention is also advantageous in that it is virtually insensitive to wide line voltage changes, and also minimizes the effect of harmonic distortion in the source voltage. For example, an increase in the line voltage as applied to the primary winding 72 of transformer 71 will be reflected in raising the input voltage to the bridge network, and as a result this increase will cause output pulses from triode 76 of greater amplitude. These pulses being applied to the grids of triodes 84 and 85 would thus tend to increase the plate current of these tubes. However, simultaneously, the voltage across the resistor 104 is increased so as to raise the potential of the cathodes 88a and 88b, which is the equivalent of decreasing the grid potential. Thus, the increase in the grid potential as supplied by the output of triode 76 is counteracted by an increase in the cathode potential of the triodes 84 and 85. This action thus serves as an automatic compensating system for changes of line voltage.

Various modifications may suggest themselves to those skilled in the art without departing from the spirit of my invention, and, hence, I do not wish to be restricted to the specific form shown or uses mentioned, except to the extent indicated in the appended claims.

I claim:

1. Apparatus of the character described, comprising: a bridge network having a direct current input, two arms of said network comprising electron emission devices, each of which has a cathode electrode; means for adjusting one of said devices to establish a reference balance voltage; means for varying the other of said devices in accordance with sensed changes from a predetermined norm of a medium characteristic; a capacitor; cathode follower connections from the cathodes of said devices to the opposite sides of said capacitor and forming an output circuit of said bridge; and means selectively operable in response to bridge unbalance to restore said medium characteristic to said norm including an energizing circuit connected to the bridge output circuit on opposite sides of said capacitor.

2. Apparatus of the character described, comprising: a bridge network having a direct current input and an output, two arms of said network comprising electron emission devices, each having a control element; means for adjusting the control element of one of said devices to establish a reference balance voltage; means for varying the other of said devices in accordance with sensed changes from a predetermined norm of a medium characteristic; means coupled with said bridge output and selectively controlled in accordance with the direction and magnitude of bridge unbalance for restoring said medium characteristic to said norm; anticipator means including a vacuum tube having a control grid circuit and cathode; temperature sensing means in said grid circuit; and a cathode follower connection between said tube and the control element of one of said devices, including an R-C network for introducing a time constant with respect to the effect of said anticipator means on said bridge network.

3. Apparatus of the character described, comprising: a bridge network having a direct current input and an output, two arms of said network comprising electron emission devices, each having a control element; means for adjusting the control element of one of said devices to establish a reference balance voltage; means for varying the other of said devices in accordance with sensed changes from a predetermined norm of a medium characteristic; means coupled with said bridge output and selectively controlled in accordance with the direction and magnitude of bridge unbalance for restoring said medium characteristic to said norm; anticipator means variable in accordance with changes in said medium characteristic, said means being coupled with the control element of said one of said devices and adapted to override the adjustment for said reference balance voltage and restore bridge balance; and timing means controlling the action of said anticipator means with respect to said device.

4. Apparatus of the character described, comprising: a bridge network having a direct current input and an output, two arms of said network comprising electron emission devices, each having a control element; means coupled with the control element of one of said devices adjustable to establish a reference balance voltage; means for varying the other of said devices in accordance with sensed changes from a predetermined norm of a medium characteristic; means coupled with said bridge output and selectively controlled in accordance with the direction and magnitude of bridge unbalance for restoring said medium characteristic to said norm; and anticipator means variable in accordance with changes in said medium characteristic, said means being coupled with the control element of said one of said devices and adapted to override the adjustment for said reference balance voltage and restore bridge balance.

5. Apparatus of the character described, comprising: a bridge network having a direct current input and an output, two arms of said network comprising electron emission devices; means for adjusting one of said devices to establish a reference balance voltage; means for varying the other of said devices in accordance with sensed changes from a predetermined norm of a medium characteristic; and means coupled with said bridge output and selectively controlled in accordance with the direction and magnitude of bridge unbalance voltage for restoring said medium characteristic to said norm, including means for converting said bridge unbalance voltage into proportional A. C. signals having relative reversed phase relation depending upon the direction of said unbalance voltage.

6. Apparatus of the character described, comprising: a bridge network having a direct current input and an output, two arms of said network comprising electron emission devices, and the remaining two arms of said network having impedance elements constituting output loads on said devices; means for adjusting one of said devices to establish a reference balance voltage; means for varying the other of said devices in accordance with sensed changes from a predetermined norm of a medium characteristic; and means coupled with said bridge output and selectively controlled in accordance with the direction and magnitude of bridge unbalance for restoring said medium characteristic to said norm.

7. In apparatus of the character described, the combination of: signal means including a bridge network responsive to temperature variations, and having an unbalance D. C. output; a transformer having a middle tapped primary winding and a secondary winding; a pair of electron emission tubes each having an anode, grid and cathode, the cathodes being connected respectively to the ends of said primary winding and the grids to the opposite sides of the output of said bridge network; a pulsating source of potential having one side connected to both of said anodes and its other side connected to the middle tap of said primary winding; and temperature corrective means coupled with said transformer secondary, and selectively controlled in accordance with relative phase reversals of alternating current therein.

8. In apparatus of the character described, the combination of: signal means including a bridge network responsive to temperature variations, and having an unbalance D. C. output; temperature corrective means operable in opposite corrective directions; a transformer having a middle tapped primary winding and a secondary winding; means for simultaneously impressing opposed pulses between the ends and middle tap of said primary winding; means for controlling the relative magnitude of said pulses in accordance with the direction and magnitude of said bridge unbalance output, whereby A. C. signals of relatively reversed phase are induced in said secondary winding; electron emission means having a plate electrode, and a grid control circuit energized from said secondary winding through an impedance element adapted to attenuate the positive half-cycles of said A. C. signal, whereby variable positive potential pulses are produced on said plate electrode; control means coupled to said plate for selectively actuating said temperature corrective means in accordance with relative phase changes in said plate potential pulses; and means for applying a feedback positive potential to said grid control circuit upon selective actuation of sai temperature corrective means, including an R-C network, whereby the temperature corrective means are actuated by pulses the frequency and length of which vary directly with variations in magnitude of said bridge unbalance output.

9. In apparatus of the character described, the combination of: signal means including a bridge network responsive to temperature variations, and having an unbalance D. C. output; temperature corrective means operable in opposite corrective directions; a transformer having a middle tapped primary winding and a secondary winding; means for simultaneously impressing opposed pulses between the ends and middle tap of said primary winding; means for controlling the relative magnitude of said pulses in accordance with the direction and magnitude of said bridge unbalance output, whereby A. C. signals of relatively reversed phase are induced in said secondary winding; electron emission means having a plate electrode, and a grid control circuit energized from said secondary winding through an impedance element adapted to attenuate the positive half-cycles of said A. C. signal, whereby variable positive potential pulses are produced at said plate electrode; control means coupled to said plate for selectively actuating said temperature corrective means in accordance with relative phase changes in said plate potential pulses; and means for applying a feedback positive potential to said grid control circuit upon selective actuation of said temperature corrective means.

10. In apparatus of the character described, the combination of: signal means including a bridge network responsive to temperature variations, and having an unbalance D. C. output; temperature corrective means operable in opposite corrective directions; a transformer having a middle tapped primary winding and a secondary winding; means for simultaneously impressing opposed pulses between the ends and middle tap of said primary winding; means for controlling the relative magnitude of said pulses in accordance with the direction and magnitude of said bridge unbalance output, whereby A. C. signals of relatively reversed phase are induced in said secondary winding; electron emission means having a plate electrode, and a grid control circuit energized from said secondary winding through an impedance element adapted to attenuate the positive half-cycles of said A. C. signal, whereby variable positive potential pulses are produced at said plate electrode; and control means coupled to said plate for selectively actuating said temperature corrective means in accordance with relative phase changes in said plate potential pulses.

11. In apparatus for the character described, the combination of: signal means including a bridge network responsive to temperature variations, and having an unbalance output potential; an actuator; electronic means for selectively energizing and deenergizing said actuator for operation in relatively reversed directions in accordance with the direction of unbalance of said bridge, including an electron emission device having a grid controlled by said output potential; an R-C network having a charging circuit, and an output circuit connected with said grid and adapted to apply a modifying bias to said grid by which the control in response to said output potential is augmented; a direct current source of potential; separate supply circuits connecting said charging circuit with said source of potential, said supply circuits being independently adjustable to vary the potential of said charging circuit; and switches for selectively connecting said supply circuits in accordance with the direction of operation of said actuator.

12. In apparatus of the character described, the combination of: signal means including a bridge network responsive to temperature variations, and having an unbalance output potential; an actuator; electronic means for energizing and deenergizing said actuator in accordance with said output potential, including an electron emission device having a grid controlled in response to changes in said output potential; a direct current source; an R-C network having a charging circuit connected with said source, and an output circuit connected with said grid, and adapted to apply a positive bias to said grid by which the control in response to said output potential is modified; and switch means for closing and opening said network charging circuit in accordance with energization and deenergization of said actuator.

13. Apparatus for regulating the temperature of a fluid medium, comprising: fluid temperature responsive means including a normally balanced network adapted to produce an unbalance pulsating direct current output signal in response to the departure of the temperature of said fluid from a predetermined normal value; means for converting said unbalance signal into an A. C. signal of one phase for one direction of unbalance and an A. C. signal of reversed phase sense for the other direction of unbalance; electron emission means having a control grid input circuit and an anode output circuit, said input circuit being energized by said A. C. signal; a high impedance element in said input circuit for attenuating the positive half-cycles only of said A. C. signal to substantially zero potential at said grid, whereby positive pulses are produced in said output circuit; means coupled to said output circuit and selectively controlled in response to relative changes of phase of said pulses to correctively return the fluid temperature to normal; and means actuated by said temperature corrective means for applying a positive bias to said control grid during the corrective operations.

14. Apparatus for regulating the temperature of a fluid medium, comprising: fluid temperature responsive means including a normally balanced network adapted to produce an unbalance pulsating direct current output signal in response to the departure of the temperature of said fluid from a predetermined normal value; means for converting said unbalance signal into an A. C. signal of one phase for one direction of unbalance and an A. C. signal of reversed phase sense for the other direction of unbalance; electron emission means having a control grid input circuit and an anode output circuit, said input circuit being energized by said A. C. signal; a high impedance element in said input circuit for attenuating the positive half-cycles only of said A. C. signal to substantially zero potential of said grid, whereby positive pulses are produced in said output circuit; and means coupled with said output circuit and selectively controlled in response to relative changes of phase of said pulses to correctively return the fluid temperature to normal.

15. Apparatus for regulating the temperature of a fluid medium, comprising: fluid temperature responsive means including a normally balanced network adapted to produce an unbalance pulsating direct current output signal in response to the departure of the temperature of said fluid from a predetermined normal value; means for converting said unbalance signal into an A. C. signal of one phase for one direction of unbalance and an A. C. signal of reversed phase sense for the other direction of unbalance; discriminator means having an input circuit energized by said A. C. signal, and an output circuit adapted to deliver positive half-cycle pulses; and means coupled with said output circuit and selectively controlled in response to relative changes of phase of said pulses to correctively return the temperature of the fluid to normal.

16. Apparatus for regulating the temperature of a fluid medium, comprising: primary signal emitting means having an A. C. signal output reversible as to phase in response to the direction of departure of the temperature of said fluid from a predetermined norm, said means including an electron emission tube having a grid limiter control input circuit and an anode output circuit; and means selectively controlled by the phase changes of said primary signal for correctively changing the fluid temperature, said means including a pair of electron emission devices, each having a control grid directly connected to said anode output circuit.

17. Apparatus for regulating the temperature of a fluid medium, comprising: primary signal emitting means having an A. C. signal output reversible as to phase in response to the direction of departure of the temperature of said fluid from a predetermined norm, said means including an electron emission tube having a grid limiter control input circuit and an anode output circuit; means selectively controlled by the phase changes of said primary signal for correctively changing the fluid temperature, said means including a pair of electron emission devices, each having a control grid directly connected to said anode output circuit; and means for applying a feedback positive potential to said grid limiter control input circuit upon selective actuation of said fluid temperature changing means.

References Cited in the file of this patent

UNITED STATES PATENTS

| | | |
|---|---|---|
| 1,946,155 | Foster | Feb. 6, 1934 |
| 2,154,375 | Chambers | Apr. 1, 1939 |
| 2,264,256 | Fairchild | Nov. 25, 1941 |
| 2,403,917 | Gille | July 16, 1946 |
| 2,443,347 | Field | June 15, 1948 |
| 2,676,286 | Buchner | Apr. 20, 1954 |
| 2,676,291 | Perkins | Apr. 20, 1954 |